Figure 1A:
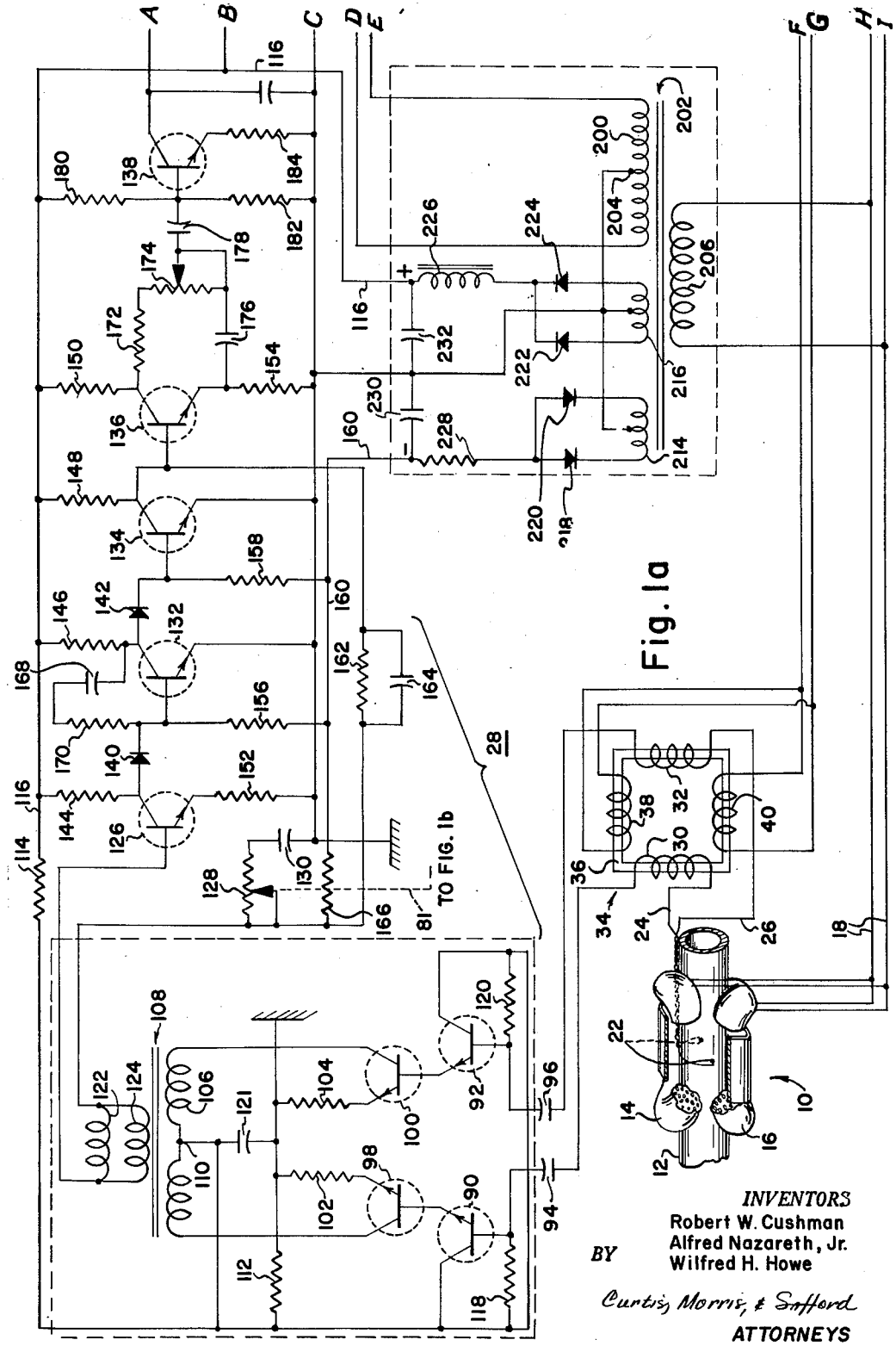

May 5, 1964 R. W. CUSHMAN ETAL 3,131,560
MAGNETIC FLOWMETER APPARATUS
Filed Dec. 28, 1960 2 Sheets-Sheet 1

INVENTORS
Robert W. Cushman
Alfred Nazareth, Jr.
BY Wilfred H. Howe

Curtis, Morris, & Safford
ATTORNEYS

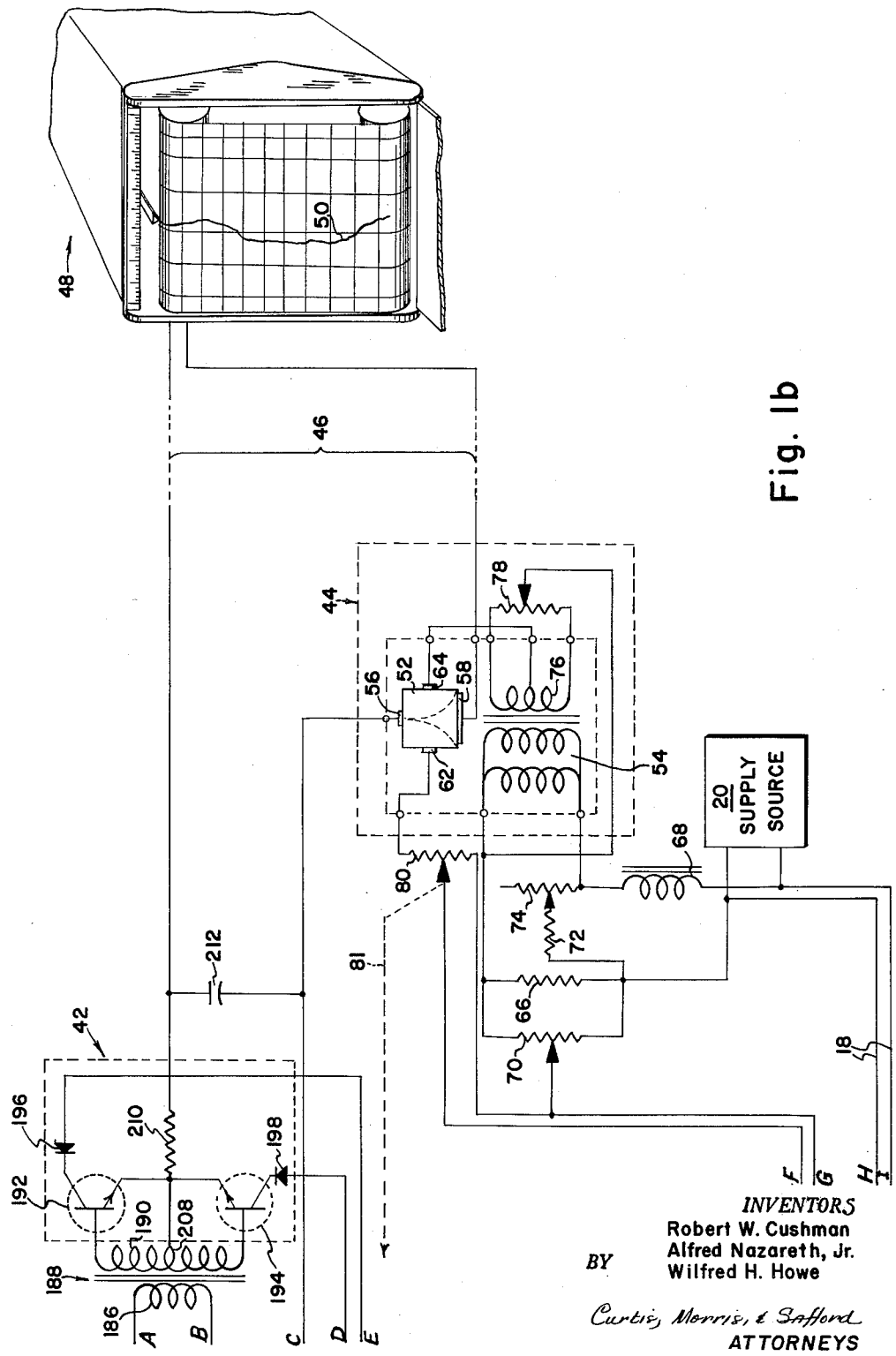

United States Patent Office 3,131,560
Patented May 5, 1964

3,131,560
MAGNETIC FLOWMETER APPARATUS
Robert W. Cushman, Sharon, Alfred Nazareth, Jr.,
Rehoboth, and Wilfred H. Howe, Sharon, Mass., assignors to The Foxboro Company, Foxboro, Mass.
Filed Dec. 28, 1960, Ser. No. 78,965
12 Claims. (Cl. 73—194)

This invention relates to magnetic flowmeter apparatus. More in particular, this invention relates to a magnetic flowmeter transmitter adapted to produce a direct-current output signal proportional to rate of flow and suitable for transmission over long distances, for example to a central station which includes recording and/or control equipment.

Magnetic flowmeters have found widespread usage in industry for measuring the flow rate of a variety of liquids. Such flowmeters typically include a "flow head" comprising coil means for developing a strong A.-C. magnetic field in the flowing liquid, and a pair of electrodes in contact with the liquid to sense the electrical signal produced by the movement of the liquid through the magnetic field. Since this signal is extremely small, an amplifier also is provided to increase the power of the signal from the flow head to a level adequate for operating a flow indicating or recording device, e.g. of the type having a motor which drives a pen across the face of a moving chart record, and which conventionally is mounted in a cabinet together with the amplifier.

With such an arrangement, the indicating or recording device usually must be located near the liquid being measured, primarily because of limitations on the length of the cable used to connect the flow head to the amplifier. When long cables are used, the cable capacitance tends to draw excessive current from the flow head, thereby reducing the accuracy of the flow measurement because of the very high effective internal impedance of the flow head. This deterioration of accuracy is particularly pronounced with liquids of low conductivity.

In many complex industrial process instrumentation systems, which may for example include equipment providing measurement and control not only of flow rates, but also of temperature, liquid level, etc., there are substantial advantages in having all of the various recording and control equipments located together at a central station. It will be evident from the character of modern industrial processes that such a central station normally will be a considerable distance from many of the places where the basic measurement signals are developed. Thus it is necessary to provide remote transmitters to produce output signals corresponding to the basic measurement data, and suitable for transmission over long distances to the central station.

Advantageously, this output signal is in the form of a direct current having a magnitude proportional to the value of the process condition being measured. In a number of such instrumentation systems presently in use, the D.-C. current level advantageously is varied from 10 to 50 milliamps to represent a full scale change in the measured process condition. By employing a D.-C. output signal, rather than A.-C. the adverse effects of stray coupling from A.-C. power lines and the like are minimized. And by using a current signal, as opposed to a voltage signal, it is possible to connect a number of receiving devices (recorders, controllers, etc.) in series with the transmission line without significantly affecting the signal level.

To provide a magnetic flowmeter transmitter of this character presents a number of difficult problems. In part, these problems stem from the fact that the flow head output signal is an A.-C. voltage (typically 60 c.p.s.) of extremely low amplitude. Also, the transmitter must not draw any significant current from the flow head electrodes; in other words, the transmitter must have a very high input impedance. In conventional magnetic flowmeters, high input impedance generally is achieved by connecting an A.-C. feedback voltage in series-opposition with the flow head output signal. This feedback voltage typically has been produced by a position-responsive device, e.g. a variable transformer or slide-wire potentiometer, the movable element of which is connected to the recorder pen. However, such an arrangement for producing an A.-C. feedback signal is unsatisfactory in the present case, because the transmitter output is in the form of an electrical signal (D.-C.) rather than the physical motion of a pen or the like.

Still other problems encountered in providing such apparatus result from the fact that the flow head output signal varies with changes in either amplitude or frequency of the supply line voltage source. When the supply voltage amplitude changes, there is a directly corresponding change in current amplitude through the magnetic coils; thus the magnetizing field changes in the flowing liquid and thereby alters the amplitude of the voltage generated across the electrodes. When the supply voltage frequency changes, there is a corresponding change in the impedance of the flow head coils, thus also varying the amplitude of current through the coils and the voltage across the electrodes. In addition, since the resistance of the coils remains constant, a change in line frequency alters the ratio of inductive reactance to resistance, and therefore the phase of the coil current (and hence the phase of the generated voltage) will shift relative to the phase of the supply voltage, thereby introducing further problems in providing an A.-C. feedback signal which at all times opposes the flow head output signal. In any event, it is clear that the flowmeter transmitter should be arranged to provide an output current which accurately represents the actual flow rate at all times, regardless of such supply voltage variations.

Accordingly, it is an object of this invention to provide magnetic flowmeter apparatus that is superior to such apparatus provided heretofore. It is another object of this invention to provide a magnetic flowmeter transmitter capable of producing a direct-current output signal suitable for transmission over long distances by means of an ordinary two-wire transmission line. It is a further object of this invention to provide such a transmitter wherein the output signal accurately represents the actual flow rate, regardless of changes in the supply line amplitude or frequency. Still another object of this invention is to provide such a transmitter that is rugged and reliable in operation over long periods of time, yet is simple in construction and economical to construct. Other objects, aspects and advantages of the invention will in part be pointed out in, and in part apparent from, the following description of a preferred embodiment of the invention, considered together with the accompanying drawings which show the preferred embodiment in schematic diagram form. The drawings consist of FIGURES 1a and 1b which should be considered as joined together along the mating short sides thereof.

Referring now to the lower left-hand corner of FIGURE 1a, there is shown a conventional flow head 10 of the type disclosed in copending application Serial No. 455,924 filed on September 14, 1954, by Handel et al., now Patent No. 3,006,188. This flow head includes a stainless steel pipe section 12 to carry the liquid being measured, and a pair of magnetic coils 14 and 16 disposed on opposite sides of the pipe to produce magnetic flux in the liquid. These coils are supplied with alternating current (60 c.p.s.) through a pair of wires 18 connected to an A.-C. supply source generally indicated at 20. A pair of electrodes 22 are positioned on opposite sides of the pipe in contact with the liquid, and the 60 c.p.s. voltage generated in the liquid, as a result of liquid movement through the flux, is picked up by these electrodes and fed through input circuit leads 24 and 26 to an amplifier generally indicated at 28.

The amplifier input leads 24 and 26 pass through balanced secondary windings 30 and 32 of a transformer 34 having a core 36 and two balanced primary windings 38 and 40 connected in parallel. As will be explained in more detail hereinbelow, these primary windings are furnished with an A.-C. signal which includes a negative feedback component and a "level set" component normally of constant amplitude. The level-set signal component is in phase with the output signal of the flow head 10 and serves as an artificial signal to set the D.-C. level of the transmitter output current for zero flow rate condition.

The negative feedback component in windings 30 and 32 opposes and substantially balances both the output signal of the flow head 10 and the constant amplitude level-set component, with the result that only a very small "difference" signal is applied to the input of the amplifier 28. As will be described in detail hereinafter, this 60 c.p.s. difference signal is intensified by the cascaded stages of amplifier 28 and is directed to a phase-sensed detector, generally indicated at 42 (FIGURE 1b), which produces a corresponding D.-C. output current. This output current is fed through a feedback control device 44 and a two-wire transmission line 46 to a remote receiver, such as a conventional chart recorder 48, at a distant central control station.

By virtue of the feedback action to be discussed below, the D.-C. output current fed to the recorder 48 is proportional in magnitude to the A.-C. output signal developed by the flow head 10, so that the chart record 50 will show the measured rate of liquid flow. When desired, other receiving devices (such as a flow controller) may be connected in series with, or in place of, the recorder 48, in accordance with the instrumentation requirements of the process involved.

The feedback control device 44 is a magnetically-operated transducer which produces, by means of a magnetic deflection circuit arrangement to be described, an A.-C. feedback signal the amplitude of which is linearly proportional to the magnitude of the transmitter D.-C. output current. For this purpose, device 44 comprises a thin wafer 52 of semiconductive material (advantageously indium arsenide because of its low sensitivity to temperature variations) disposed in a 60 c.p.s. alternating magnetic field produced by two coils, schematically indicated at 54, positioned above and below the large-area flat surfaces of the wafer respectively. The transmitter output current is directed through terminals 56 and 58 at opposite ends of the wafer and produces therein a corresponding movement of electrical charges which in the present case consists of a stream of electrons. The device 44 is of known construction, e.g. see U.S. Patent 2,464,807, and no invention is claimed herein with respect to such a device per se.

As is well known, the magnetic field produced by coils 54 will deflect the moving charges towards one side or the other of the wafer 52, depending upon whether the flux is directed into or out of the plane of the drawing. Since the direction of the magnetic field alternates at 60 c.p.s. rate, the moving charges are periodically deflected back and forth (i.e. side-to-side) at a 60 c.p.s. rate. In accordance with known principles of operation, commonly referred to as the "Hall effect," this periodic deflection of the charges generates between the side terminals 62 and 64 of wafer 52 a corresponding 60 c.p.s. voltage. Moreover, the amplitude of this voltage is linearly proportional to the magnitude of D.-C. current flowing through the end terminals 56 and 58 of the wafer, as well as linearly proportional to the amplitude of current flow through the coils 54.

The magnetic coils 54 are energized from the A.-C. supply source 20 through a circuit including a series resistor 66 on one side and a series inductor 68 on the other side. A level-set potentiometer 70 is connected in parallel with resistor 66, and a resistor 72 and trimming potentiometer 74 are connected between respective ends of resistor 66 and inductor 68. The parameters of these various circuit elements are so proportioned that the impedance presented to the source 20 by these elements (and coils 54) has substantially the same phase angle as that of the impedance presented to the source by the flow head magnetic coils 14 and 16. In other words, the ratio of inductance-to-resistance of the magnetic energizing circuit including the coils 54 is essentially equal to the ratio of inductance-to-resistance of the flow head coils 14 and 16.

Accordingly, with this arrangement the current flowing through the coils 54 will be in phase with the current flowing through the flow head coils 14 and 16, and this condition will be obtained even though the frequency of source 20 changes. Moreover, in both the flow head 10 and the feedback control device 44, the output voltages will be in phase with the current flowing through the respective magnetic coils, since in both cases the output voltage is generated in response to a magnetic flux which in turn is produced by the coil current. Therefore, the voltage produced by device 44 across terminals 62 and 64 will be in phase with the output voltage produced by flow head 10, and the amplitude of these two voltages will vary correspondingly with changes in the source voltage amplitude.

In some flowmeter installations, the output voltage produced by the magnetic flow head will not be exactly in phase with the coil current, due for example to the field-retarding effect introduced by a thick-walled metal pipe section. In practice, the resulting phase shift normally will amount to only several degrees. However, to avoid even small errors from this effect, the present apparatus is provided with an adjustable compensation arrangement consisting of inductor 68 and trimming potentiometer 74. Adjustment of this potentiometer serves to shift the phase of the current through coils 54 by a small amount to assure that the voltage generated at terminals 62 and 64 is in phase with the flow head output voltage.

Terminals 64 of feedback control device 44 is connected through a conventional "hum-bucking" circuit comprising a center-tapped winding 76, which is coupled to the magnetic coils 54, and a potentiometer 78. This circuit introduces a compensating A.-C. voltage of adjustable magnitude in series with the output circuit of device 44 in order to balance out the quadrature voltage induced in the output leads by the magnetic field of coils 54.

The output circuit of the feedback control device 44 is completed by a connection from the movable contact of potentiometer 78 to the upper end of level-set potentiometer 70, and by a connection from the movable contact of this latter potentiometer to a span-adjusting potentiometer 80 the other end of which is returned to terminal 62 of the device 44. Thus, the span-adjusting potentiometer is energized not only by the A.-C. voltage across terminals 62 and 64 but also by the A.-C. voltage developed across level-set potentiometer 70 by the current flow into the coils 54. Consequently, the voltage developed across potentiometer 80 is a composite signal made up of two components, one being proportional to the D.-C. current passing through terminals 56 and 58 of device 44, and the other being proportional to the setting of the level-set potentiometer 70.

A portion of the composite signal across span-adjusting potentiometer 80 is picked off by the movable arm of this potentiometer and fed to the primary windings 38 and 40 of transformer 34. It will be apparent that the setting of potentiometer 80 determines the magnitude of the negative feedback signal for a given D.-C. output current and thereby controls the incremental change in transmitter output current for a given incremental change in flow rate. Consequently, the transmitter can be adjusted by potentiometer 80 to provide full scale output current for various flow rates.

A condition-responsive transmitter advantageously is capable of producing an electrical output of finite magnitude when the measured condition is at the minimum value (e.g. zero) of any selected range. To this end, the transmitter described herein is arranged to provide an output current of 10 milliamps for zero flow rate condition, whereas the transmitter output current is 50 milliamps at full scale flow rate for any particular flow range selected.

In more detail, the A.-C. voltage component fed from level-set potentiometer 70 through span-adjusting potentiometer 80 to the transformer windings 38 and 40 will be in phase with the output voltage normally received from the flow head 10, and thus this component serves as an artificial input signal to the amplifier 28. With a zero flow rate condition, potentiometer 70 is adjusted to provide a transmitter output current of 10 milliamps. When the span of the instrument is changed by adjusting potentiometer 80, the amplitude of the level-set signal component is altered correspondingly, so that at the new setting the transmitter output still will be 10 milliamps for zero flow rate condition.

One important advantage of the feedback and artificial signal arrangement described above is that the transmitter output is essentially unaffected by changes in amplitude or frequency of the supply source 20. If the 60 c.p.s. supply line voltage decreases, there will be of course a corresponding drop in the flow head output signal. Similarly, because the 60 c.p.s. line current fed to control device 44 also decreases, the artificial signal component developed across potentiometer 70 will drop correspondingly. However, the 60 c.p.s. output of control device 44 also will drop correspondingly, because its magnetic field strength decreases, and this drop in feedback signal tends to offset the drop in the real and artificial input signals, thus maintaining the D.-C. output current of the transmitter essentially constant.

On the other hand, if the frequency of the supply source 20 shifts, the inductive reactance of the flow head coils 14 and 16 will change, thus altering both the amplitude and phase of the current through these coils and changing the amplitude and phase of the flow head output signal. However, this shift in source frequency will produce effectively the same proportional change in the inductive reactance of the magnetic coils 54 of the feedback control device 44, so that there is a similar change in the amplitude and phase of the current passing through these latter coils (and hence through resistor 66 and level-set potentiometer 70). Consequently, both the negative feedback component and the artificial signal component in transformer windings 38 and 40 will be altered, with respect to both amplitude and phase, to the same extent as the output signal of the flow head 10, with the result that the transmitter D.-C. output current remains constant.

It should particularly be noted that with this arrangement the 10 ma. zero-flow signal also is maintained substantially constant when the line voltage or frequency changes. Thus there is no need for the special regulating devices (i.e. Zener diodes and the like) conventionally used with equipment of the "live zero" type.

Referring now in more detail to the amplifier 28, the first stage of amplification is a balanced circuit comprising a pair of transistors 90 and 92 the base electrodes of which are coupled to input leads 24 and 26 by respective capacitors 94 and 96. The emitter electrodes of these transistors are connected respectively to the base electrodes of a second pair of transistors 98 and 100. The emitter electrodes of this second pair of transistors are connected through resistors 102 and 104 to ground, and the collector electrodes are connected to the remote ends of a center-tapped primary winding 106 of a transformer 108.

Operating potential is provided for the collector electrodes of transistors 98 and 100 by a connection from the center-tap 110 of tarnsformer 108 to a voltage-dividing circuit consisting of two resistors 112 and 114 bridged between a positive voltage bus 116 and ground. Operating potential for the collector electrodes of the first pair of transistors 90 and 92 is similarly provided by a connection to the junction of these resistors, and through two other resistors 118 and 120 to the base electrodes of the first transistor pair. A by-pass capacitor 121 is connected between center-tap 110 and ground.

This balanced amplifier arrangement substantially minimizes the effects of stray influences, such as ground circulating currents, on the output of the amplifier. Also, the dual transistor arrangement wherein the emitters of the first pair of transistors 90 and 92 provide all the base current for the second pair of transistors 98 and 100 advantageously produces a high amplifier input impedance, thereby assuring a relatively small flow of current from the flow head 10.

The secondary windings 122 and 124 of transformer 108 are connected in parallel, with one common terminal thereof being connected to the base electrode of a transistor 126, and the other common terminal thereof being connected through a variable resistor 128 and a capacitor 130 to circuit ground. Transistor 126 is the first stage of a multistage, unbalanced (single-ended) amplifier including transistors 132, 134, 136 and 138, all arranged in common emitter configurations. The first, second and third of these stages are coupled together through diodes 140 and 142, and the third and fourth stages are directcoupled. The collector electrodes of the first four stages are furnished operating potential from positive voltage bus 116 through respective resistors 144, 146, 148 and 150; the emitter electrodes of the first and fourth stages are connected through respective resistors 152 and 154 to ground, and the emitter electrodes of the second and third stages are connected directly to ground. The base electrodes of the second and third stages are connected through respective resistors 156 and 158 to a negative voltage bus 160. The base electrode of the fourth stage is coupled through a negative feedback circuit to the secondary windings of transformer 108, this feedback circuit including a series resistor 162 in parallel with a capacitor 164, and also variable resistor 128 and capacitor 130 previously mentioned. The junction of resistors 128 and 162 is connected through a resistor 166 to negative voltage bus 160; resistors 166, 162 and 148 define a voltage-dividing network which provides operating potential at the base of the fourth transistor 136. Variable resistor 128, forming part of the negative feedback circuit just described, serves as an adjustment for controlling the amplifier gain, and is ganged by linkage 81 to span-set potentiometer 80 to maintain stability of the overall system at the various span settings. A second negative feedback circuit is provided from the collector of the second stage transistor 132, through a capacitor 168 and a resistor 170, to the base of that transistor; this feedback circuit enhances the stability of the amplifier by providing, in effect, a high-frequency cut-off of signals passing through the amplifier.

The fourth transistor stage 136 serves as a phaseadjustment circuit to provide a proper phase relationship between the amplified 60 c.p.s. signal and the 60 c.p.s. energizing voltage applied to the phase-sensed detector 42. In more detail, the collector and emitter resistors 150 and 154 of this transistor are of equal value and form, in effect, a split load whereby the 60 c.p.s. signal on the emitter is 180° out-of-phase with the 60 c.p.s. signal on the collector. Connected between the collector and emitter is a series circuit having a fixed resistor 172, a potentiometer 174 and a capacitor 176, the movable contact of the potentiometer being connected to one end terminal thereof. With this arrangement, the 60 c.p.s. output signal on the movable potentiometer contact will have a phase intermediate the phases of the collector and emitter signals, and the phase of this output signal can be varied by shifting the movable contact of the potentiometer.

The potentiometer output signal is coupled through a capacitor 178 to the base of the fifth stage transistor 138, this base being provided with operating potentials through two resistors 180 and 182 bridged between the positive voltage bus 116 and ground. The emitter of this transistor is connected through a resistor 184 to ground, and the collector is connected through the primary winding 186 of a transformer 188 to the positive voltage bus. Thus the amplified 60 c.p.s. signal appears in the center-tapped secondary 190 of this transformer, and is fed from there to the phase-sensed detector 42.

The phase-sensed detector 42 includes a pair of transistors 192 and 194 the base electrodes of which are connected to respective ends of secondary winding 190. The collector electrodes of these transistors are connected through corresponding blocking diodes 196 and 198 to the respective ends of a center-tapped secondary winding 200 of a power transformer 202, the center-tap 204 being grounded. The primary 206 of this transformer is supplied with 60 c.p.s. current from source 20. The emitter electrodes of transistors 192 and 194 are connected together to the center-tap 208 of secondary 190 and, through a resistor 210, furnish the D.-C. output current to the feedback control device 44 and the recorder 48, a by-pass capacitor 212 being provided to smooth out fluctuations in the current.

When the signal on secondary winding 190 is in phase with the voltage on secondary winding 200, i.e. when the potential applied to the base of transistor 192 goes positive at the same time that the potential applied to the collector of this transistor goes positive, both transistors 192 and 194 will conduct on alternate half-cycles of the 60 c.p.s. signal. The amount of conduction will be proportional to the amplitude of the signal on secondary 190, and the resulting D.-C. current will be transmitted through the feedback control device 44 and transmission line 46 to the recorder 48.

Normally, the phase of the amplified 60 c.p.s. signal on secondary winding 190 remains fixed, regardless of changes in the flow rate of the liquid in the pipe section. However, if the signal on secondary winding 190 inadvertently becomes out-of-phase with respect to the voltage on secondary winding 200, e.g. due to a reversal in the direction of liquid flow through the pipe section 12, the base electrodes of transistors 192 and 194 will go positive when the corresponding collector electrodes go negative, and hence there will be no conduction through the transistors. This blocking action assures that there will be no unstable "lock-up" of the system in the event that the phase of the amplified 60 c.p.s. signal is inadvertently reversed.

The positive and negative voltage buses 116 and 160 are supplied with D.-C. potentials by rectifier power supplies including secondary windings 214 and 216 of the power transformer 202. These power supplies are full-wave arrangements wherein the ends of the secondary windings are connected through diodes 218, 220 and 222, 224 to respective filters comprising a series inductor 226, a series resistor 228, and shunt capacitors 230 and 232. The center-taps of the secondaries are connected to circuit ground, and the outputs of the filters are connected to the respecitve positive and negative buses 116 and 160.

Although a preferred embodiment of the invention has been set forth in detail, it is desired to emphasize that this is not intended to be exhaustive or necessarily limiting; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

We claim:
1. In magnetic flowmeter apparatus for producing an output signal corresponding to the flow rate of a fluid, said apparatus including a flow head of the type having magnetizing coil means energized by an A.-C. supply source for producing flux through the fluid, and wherein sensing means are provided to detect the electromotive force generated by fluid movement; that improvement in said apparatus which comprises a transmitter including an amplifier having an input circuit coupled to the sensing means of said flow head to receive the A.-C. flow signal produced thereby and arranged to produce a D.-C. output current corresponding to its A.-C. input signal; a magnetically-operated feedback control device connected to the output of said amplifier to receive said D.-C. output current, means to develop within an element of said device a movement of electrical charges corresponding to said D.-C. output current, a pair of output terminals for said device, winding means energized by said A.-C. supply source and operable to produce alternating flux within said element to control the movement of said charges so as to develop between said output terminals an A.-C. voltage corresponding in amplitude to the magnitude of said D.-C. output current and to the amplitude of said supply source voltage; and circuit means for coupling said A.-C. voltage to said amplifier input circuit in series-opposition to the A.-C. flow signal produced by said flow head.

2. In magnetic flowmeter apparatus for producing an output signal corresponding to the flow rate of a fluid, said apparatus including a flow head of the type having magnetizing coil means energized by an A.-C. supply source for producing flux through the fluid, and wherein sensing means are provided to detect the electromotive force generated by fluid movement; the improvement in said apparatus which comprises a transmitter including an amplifier having an input circuit coupled to the sensing means of said flow head to intensify the A.-C. flow signal produced thereby and arranged to produce a D.-C. output current corresponding to its A.-C. input signal; a feedback control device coupled to said amplifier to receive said D.-C. output current, said device including means to develop within an element thereof a movement of electrical charges corresponding to said D.-C. output current, a pair of output terminals disposed on opposite sides of the line of movement of said charges, control means energized by said A.-C. supply source and operable to deflect said charges back and forth between said output terminals and develop therebetween an A.-C. voltage corresponding in amplitude to the magnitude of said D.-C. output current and to the amplitude of said supply source voltage; and circuit means for coupling said A.-C. voltage to said amplifier input circuit in series-opposition to the A.-C. flow signal produced by said flow head.

3. In magnetic flowmeter apparatus for producing an output signal corresponding to the flow rate of a fluid, said apparatus including a flow head of the type having magnetizing coil means energized by an A.-C. supply source for producing flux through the fluid, and wherein sensing means are provided to detect the electro-motive force generated by fluid movement; that improvement in said apparatus which comprises a transmitter including an amplifier having an input circuit coupled to the sensing means of said flow head to intensify the A.-C. flow signal produced thereby and to produce a D.-C. output current corresponding to said A.-C. flow signal; a feedback control device including means to develop within an element thereof a movement of electrical charges, a pair of output terminals positioned adjacent the line of movement of said charges to develop a voltage proportional to the current density and to the direction of movement thereof, first input means to receive an electrical signal for controlling the current density of said charges, second input means to receive an electrical signal for controlling the direction of movement of said charges relative to said output terminals, one of said input means being connected to the output of said amplifier to receive said D.-C. output current and the other of said input means being energized by said A.-C. supply source, thereby to develop between said output terminals an A.-C. voltage corresponding in amplitude to the magnitude of said D.-C. output current and to the amplitude of said supply source voltage; and circuit means for coupling said A.-C. voltage to said amplifier input circuit in series-opposition to the A.-C. flow signal produced by said flow head.

4. In magnetic flowmeter apparatus for producing an output signal corresponding to the flow rate of a fluid, said apparatus including a flow head of the type having magnetizing means energized by an A.-C. supply source for producing flux through the fluid, and wherein sensing means are provided to detect the electromotive force generated by fluid movement; that improvement in said apparatus which comprises a transmitter including an amplifier having an input circuit coupled to the sensing means of said flow head to intensify the A.-C. flow signal produced thereby and arranged to produce a D.-C. output current corresponding to its A.-C. input signal; a magnetically-operated feedback control device having a pair of input terminals connected in series with the output of said amplifier to produce a movement of electrical charges corresponding to said output current, coil means for said device and arranged to produce a magnetic field which interacts with said electrical charges, an energizing circuit coupling said coil means to said A.-C. supply source, said device including means responsive to the interaction between said magnetic field and said electrical charges to produce an A.-C. feedback voltage corresponding in amplitude to the magnitude of said D.-C. output current fed to said input terminals and to the amplitude of said supply source voltage fed to said coil means; and negative feedback means for coupling said A.-C. feedback voltage to said amplifier input circuit in series-opposition to the A.-C. flow signal produced by said flow head.

5. Apparatus as claimed in claim 4, wherein the impedance phase angle of said energizing circuit and said coil means is at least substantially equal to the impedance phase angle of said magnetizing means, whereby to maintain the respective currents through said magnetizing means and said coil means in phase.

6. Apparatus as claimed in claim 4 including impedance means connected in series with said coil means to develop a voltage corresponding to the current flowing through said coil means, and circuit means for feeding at least a portion of the voltage so developed as a level-set signal to the input circuit of said amplifier in series-aiding relation to said A.-C. flow signal, whereby to establish a stabilized D.-C. output current level for zero flow rate condition.

7. Apparatus as claimed in claim 6 including voltage-adjusting means in said negative feedback means to control the amplitude of the A.-C. voltage fed thereby to said amplifier input circuit so as to accommodate changing the operating range of the transmitter, and second circuit means operable with said voltage-adjusting means to control the amplitude of said level-set signal so as to maintain said D.-C. output current level constant regardless of changes in operating range.

8. A magnetic flowmeter transmitter for producing a direct-current output signal corresponding to the flow rate of a fluid, said transmitter being adapted for use with a flow head of the type having magnetizing coil means energized by an A.-C. supply source for producing flux through the fluid, and wherein sensing means are provided to detect the electromotive force generated by fluid movement; said transmitter comprising an amplifier having an input circuit coupled to the sensing means of said flow head to intensify the A.-C. flow signal produced thereby and to produce a D.-C. output current corresponding to said A.-C. flow signal; a feedback control device having a pair of input terminals coupled to said amplifier to receive said D.-C. output current, control winding means for said device, an energizing circuit connecting said control winding means to said A.-C. supply source, said device including means to produce an A.-C. voltage corresponding in amplitude to the magnitude of said D.-C. output circuit and to the amplitude of said supply source voltage and in phase with the current through said winding means, the impedance phase angle of said energizing circuit including said control winding means being at least substantially equal to the impedance phase angle of said magnetizing coil means, so that the respective currents through said winding means and coil means will be maintained in phase; and circuit means for coupling said A.-C. voltage to said amplifier input circuit in series-opposition to the A.-C. flow signal produced by said flow head.

9. A magnetic flowmeter transmitter for producing a direct-current output signal corresponding to the flow rate of a fluid, said transmitter being adapted for use with a flow head of the type having magnetizing coil means energized by an A.-C. supply source for producing flux through the fluid, and wherein sensing means are provided to detect the electromotive force generated by fluid movement; said transmitter comprising an amplifier having an input circuit coupled to the sensing means of said flow head to intensify the A.-C. flow signal produced thereby and to produce a D.-C. output current corresponding to said A.-C. flow signal; a magnetically-operated feedback control device including a semi-conductor element, a pair of input terminals at opposite ends of said element and connected to said amplifier to direct through said element a movement of electrical charges corresponding to said D.-C. output current, a pair of output terminals on opposite sides of said element, control coil means energized by said A.-C. supply source and operable to produce alternating flux within said element in a direction that is transverse to the direction of movement of said charges, thereby to develop between said output terminals an A.-C. voltage corresponding in amplitude to the magnitude of said D.-C. output current and to the amplitude of said supply source voltage; and circuit means for coupling said A.-C. voltage to said amplifier input circuit in series-opposition to the A.-C. flow signal produced by said flow head.

10. Magnetic flowmeter transmitter apparatus comprising coil means for producing A.-C. flux through a fluid, a source of A.-C. power for said coil means, sensing means for detecting the A.-C. flow signal generated in said fluid by the movement thereof, an amplifier having its input coupled to said sensing means to intensify said A.-C. flow signal and to produce a D.-C. output current corresponding to the A.-C. flow signal, a transmission line connected to the output of said amplifier to direct said D.-C. output current to a distant receiving unit, a feedback control device connected in series with said transmission line and comprising electrical converter means for producing an A.-C. feedback signal corresponding to said D.-C. output current, an energizing circuit for connecting said converter means to said source of A.-C. power, means for coupling said A.-C. feedback signal to said amplifier input circuit, level-set signal producing means to feed an artificial signal to said amplifier input for producing a predetermined D.-C. output current corresponding to zero flow rate condition, and circuit means for energizing said level-set means from said A.-C. power source.

11. Apparatus as claimed in claim 10, wherein said energizing circuit includes impedance means connected in series with said converter means to develop a voltage drop in accordance with current flowing through said converter means from said source of A.-C. power, said level-set means being energized by at least a portion of the voltage developed across said impedance means.

12. For use in an industrial process instrumentation system, a transmitter for producing a direct-current output signal corresponding to the value of a process condition, said transmitter being adapted for use with sensing means of the type having electrical circuit means energized by an A.-C. supply source for producing an A.-C. measurement signal which is responsive to the value of the process condition and also to the amplitude of the A.C. supply voltage; said transmitter comprising an amplifier having an input circuit coupled to said sensing means to intensify the A.-C. measurement signal produced thereby and to develop a D.-C. output current corresponding to its A.-C. input signal; a feedback control device including an element having a pair of input terminals to which an electric current may be applied to produce within said element a movement of electrical charges corresponding to said electric current, a pair of output terminals coupled to said element adjacent the path of movement of said electrical charges, control coil means operable to produce magnetic flux within said element in accordance with current supplied to said control coil means, said magnetic flux being in a direction that is transverse to the direction of movement of said charges to produce between said output terminals a voltage corresponding in magnitude both to the current directed to said input terminals and to the current fed through said control coil means; circuit means for developing a supply current corresponding to the voltage amplitude of said A.-C. supply source; means for directing one of said developed currents to said input terminals and the other of said developed currents to said control coil means, whereby an A.-C. output voltage is generated at said output terminals corresponding in amplitude to the magnitude of said D.-C. output current and to the amplitude of said A.-C. supply source; and circuit means for coupling to said amplifier input circuit an A.-C. feedback signal corresponding to said A.-C. output voltage and in opposition to said A.-C. input signal.

References Cited in the file of this patent
UNITED STATES PATENTS

| | | |
|---|---|---|
| 2,464,807 | Hansen | Mar. 22, 1949 |
| 3,039,306 | Koblenz et al. | June 19, 1962 |

FOREIGN PATENTS

| | | |
|---|---|---|
| 816,107 | Great Britain | July 8, 1959 |